United States Patent

Nahta

[11] 4,192,648
[45] Mar. 11, 1980

[54] CATIONIC DYE CARRIER AND SELECTIVE PROCESS FOR DYEING POLYESTERS

[75] Inventor: Roop C. Nahta, Charlotte, N.C.

[73] Assignee: GAF Corporation, New York, N.Y.

[21] Appl. No.: 832,689

[22] Filed: Sep. 12, 1977

[51] Int. Cl.² .............. D06P 1/667; D06P 3/854; D06P 3/87
[52] U.S. Cl. .................................. 8/86; 8/89 R; 8/169; 8/171; 8/21 C
[58] Field of Search ............... 8/169, 171, 89 R, 86

[56] References Cited

U.S. PATENT DOCUMENTS

| | | | |
|---|---|---|---|
| 2,880,050 | 3/1959 | Fortess et al. | 8/171 |
| 3,324,084 | 6/1967 | Horn et al. | 8/173 |
| 3,527,557 | 9/1970 | Cheape et al. | 8/171 |
| 3,617,211 | 11/1971 | Dawson | 8/173 |
| 3,915,634 | 10/1975 | Pariser | 8/169 |
| 4,027,346 | 6/1977 | Wada et al. | 8/169 |

*Primary Examiner*—Donald E. Czaja
*Assistant Examiner*—Maria S. Tungol

*Attorney, Agent, or Firm*—Marilyn J. Maue; Walter C. Kehm

[57] ABSTRACT

A cationic dye carrier composition comprising a mixture of between about 50 wt% and about 85 wt% phenoxyethanol; between about 5 wt% and about 45 wt% of the triethanol amine salt of phenoxy poly(ethyleneoxy) phosphonic ester having the formula:

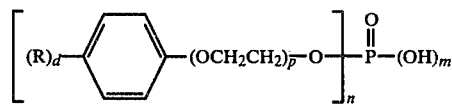

wherein n is a whole integer of 1 or 2; m is 3-n; d is 0 or 1; p is a mixture averaging 8, 9, 10, 11 or 12 units and R is alkyl having from 4 to 18 carbon atoms and between about 0 wt% and about 45 wt% butylbenzoate to provide a 100% carrier composition. The carrier composition is employed for cationic dyes in the dyeing of cationic dyeable polyester fabric, particularly blends of polyesters.

5 Claims, No Drawings

CATIONIC DYE CARRIER AND SELECTIVE PROCESS FOR DYEING POLYESTERS

The dyeing of polyester fiber or fabric presents many problems, including the penetrability of the dye, particularly in the case of cationic dye compositions, and selectivity and confinement of the dye to the cationic dyeable portions of the fabric. Often it is desirable to dye a fabric in a pattern in which a certain portion of the fabric is suited for dyeing with a cationic dye and another portion is reserved for dyeing with a disperse or other non-cationic type of dye. In these instances, it is difficult to prevent staining of the non-cationic dyeable portions since, not only the dye, but also the carrier, tends to bleed over the boundaries of the pattern. Merely wetting the fabric with the carrier composition usually induces a yellow discoloration in the portions which resist dyeing with the cationic dyes. This is particularly objectionable when the reserved portion of the fabric is a light shade or white and when it is desired to preserve such light or white color in the finished fabric.

Of the commercial techniques for dyeing such fibers or fabrics, normal exhaust dyeing at 210°–270° F. under pressures up to 70 psig, require high temperature stability of the carrier composition. The reason for this is that the dwell time at these temperatures and pressures is relatively long, for example 15 minutes to 1.5 hours.

Another technique involves steam dyeing at a temperature of about 220° F. which utilizes an extremely short dwelling time from about 30 seconds to about 10 minutes maximum. In this type of dyeing operation, the carrier must possess special properties such as fast penetration of the fabric coupled with rapid and complete exhaustion of the dye from the carrier.

It is an object of this invention to satisfy the above mentioned dye-carrier requirements while providing additional advantages such as non-combustability, elimination of objectionable odor and low toxicity of the carrier and its mixtures with the dyestuff and other non-toxic ingredients of the dye bath.

In accordance with the present invention, there is provided an improved dye carrier composition containing as the active ingredients, between about 50 wt% and about 85 wt% phenoxyethanol; between about 5 wt% and about 45 wt% of the triethanol amine salt of a phenoxy poly(ethyleneoxy) phosphonic ester having the formula:

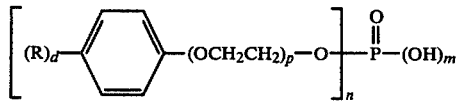

wherein n is a whole integer of 1 or 2; m is 3-n; d is 0 or 1; p is a mixture averaging 8, 9, 10, 11 or 12 units and R is alkyl having from 4 to 18 carbon atoms and between about 0 wt% and about 45 wt% butylbenzoate combined so as to provide a 100% carrier composition.

The above composition provides temperature stability above 300° F. for extended periods of time, e.g., several days, while providing fast penetration of the cationic dyeable portions of polyester fabric and substantially complete and rapid exhaustion of the dye onto the fabric. This combination of properties permits utilization of the present carrier composition in the processes of steam dyeing and exhaust pressure dyeing with cationic dyes.

In the above composition, the addition of butylbenzoate is optional but for dyeing operations requiring short dwell time, butylbenzoate up to 45 wt%, preferably up to 15 wt%, is recommended for exceptionally fast exhaustion of the dye from the carrier.

For the purposes of the present invention and disclosure, the carrier composition is the mixture of phenoxyethanol, the triethanol amine salt and any butylbenzoate; the carrier dispersion is the carrier composition which has been diluted for incorporation with a dye solution; the dye solution is a mixture of the dye with an inert liquid diluent; the dye-carrier composition is the combined carrier dispersion and dye solution; and the dye bath is the dye-carrier composition diluted or thickened to the desired viscosity and concentration for dyeing fabric.

The carrier compositions of the present invention are prepared by mixing the above ingredients in proportions within the above ranges at a temperature of from about 25° C. to about 125° C. preferably between about 60° C. and about 100° C., under atmospheric pressure until a uniform liquid mixture is obtained, usually within the period from about 5 minutes to about 1 hour.

It is to be understood that the present compositions can additionally include additives which do not perform in a dye carrier function, but which may affect the performance of the dye carrier. These additives include emulsifiers, surfactants, foam stabilizers, etc., such as polyoxyethylated alkyl amine, e.g., Katapol PN-430; the ammonium salt of a sulfonated nonylphenoxy poly(ethyleneoxy) ethanol, e.g., Alipal CO436; the condensate of coconut oil and diethanol amine, e.g., GAFAMIDE; sodium N-methyl-N-oleoyltaurate, e.g., Igepon T-51; Polygum 272, etc. Such additives, when employed, are added to the dye carrier composition, dye bath or carrier solution in an amount of from about 0.01 wt% to about 10 wt% based on the dye-carrier composition.

The carrier compositions of the present invention are slightly acidic which provide for better solubility of the cationic dye in the dye bath thus permitting more concentrated dye preparations. Accordingly, highly concentrated dye pastes, up to 25 wt% concentration dye in the dye-carrier composition can be prepared. Generally, the concentration of cationic dye in a dye bath containing the present carrier composition can be varied between about 0.01 and about 15 wt%, however, preferred concentrations of between about 0.1 and about 10 wt% are particularly recommended. Commercial dye-carrier compositions for cationic dyes are generally basic having a pH in the range of 9.2 and 8.4. The efficacy of these commercial carriers is limited, requiring significantly larger volumes of the carrier to achieve equivalent levels of dye development on the fibers or fabrics. The present dye-carrier composition is employed at a pH of between about 2 and 7, more often between about 2.5 and about 6.5.

The carrier compositions of the present invention are suitable for all cationic dyes of which the basic dyes such as the Genacryl ® dyes listed in Table I are preferred. Of these, Genacryl Blue 3G, Genacryl Yellow 4G and Genacryl Brilliant Red B, etc., are most preferred.

TABLE I

| Dye | AATCC Prototype Designation | Color Index No. |
| --- | --- | --- |
| Genacryl Red 4B | Basic Violet 16 | 48013 |
| Genacryl Blue 3G | Basic Blue 3 | 51005 |
| Genacryl Blue 5B | Basic Blue 5 | 42140 |
| Genacryl Orange G | Basic Orange 21 | 48035 |
| Genacryl Orange R | Basic Orange 22 | 48040 |
| Genacryl Pink 3G | Basic Red 14 | — |
| Genacryl Pink G | Basic Red 13 | 48015 |
| Genacryl Yellow 4G | Basic Yellow 11 | 48055 |
| Genacryl Brilliant Yellow 10GF | Basic Yellow 64 | — |
| Genacryl Yellow GGL | Basic Yellow 65 | — |
| Genacryl Yellow RRL | Basic Yellow 25 | — |
| Genacryl Brilliant Pink FFB | Basic Red 49 | — |
| Genacryl Blue BGLA | Basic Blue 54 | — |
| Genacryl Blue RLG | Basic Blue 60 | — |
| Genacryl Violet RL | Basic Violet 25 | — |
| Genacryl Black GM | — | — |
| Genacryl Black OM | — | — |
| Genacryl Brilliant Red B | Basic Red 15 | — |
| Victoria Green S Ext. Cone | Basic Green 4 | 42000 |
| Sevron Yellow L | Basic Yellow 13 | — |
| Genacryl Yellow 5GF | Basic Yellow 13 | — |
| Astrazon Orange G | Basic Orange 21 | 48035 |
| Rhodamine B | Basic Violet 10 | 45170 |
| Sevron Yellow R | Basic Yellow 11 | 48055 |
| Sevron Brilliant Red 4G | Basic Red 14 | — |
| Sevron Blue B | Basic Blue 21 | — |
| Sevron Blue 2G | Basic Blue 22 | — |
| — | Basic Blue 1 | 42025 |
| — | Basic Violet | 48020 |

The dye is incorporated in the carrier dispersion preferably by mixing an individual cationic dye or mixtures of said dyes with a concentrated weak organic acid, such as glacial acetic acid or formic acid in a ratio of between about 1:0.25 to about 1:4 preferably between about 1:0.5 and about 1:2, dye:acid on a weight basis and adding water, preferably at an elevated temperature up to about 100° C., until a solution is obtained. The present carrier composition is prepared for incorporation with the dye solution by dilution with between about 0.1 and about 8 volumes, preferably between about 0.5 and about 4 volumes of water to provide a concentration of active carrier ingredients in aqueous dispersion between about 10 wt% and about 90 wt%. The dye solution and the resulting carrier dispersion are then admixed to provide the dye-carrier composition and the pH is adjusted with a weak organic acid, such as formic or acetic acid, e.g., to between about 2.8 and about 6.5. The concentration of the dye in the resulting dye-carrier composition, before further dilution or thickening, is between about 0.1 and about 20 wt% of the carrier composition.

A thickening agent, such as ethylene maleic anhydride, e.g., EMA-91; a carboxy vinyl polymer, e.g., Carbopol; guar, a natural gum, e.g., Polygum 372; Syngum D47D; a methyl vinyl ether/maleic anhydride copolymer; N-methyloleoyltaurate, e.g., Polygum 272; or any other conventional thickening agent can be optionally added to the carrier composition or dispersion in an amount up to the weight of the active carrier composition when it is desirable to alter the viscosity of the dye-carrier composition. Depending upon the use of the dye mixture, further dilution with water can be effected to provide the dye bath. Generally, it is recommended that the dye bath contain between about 0.01% and about 18%, preferably between about 0.1% and about 10% by weight of cationic dye based on total volume. The dye-carrier composition employed in the present process is between about 1 and about 25 wt% of the fiber to be dyed.

Application of the cationic dye to the fabric is effected by any of the conventional methods. For example, the fabric can be padded with the dye-carrier composition at a temperature between about 50° F. and about 150° F. to between about 60% and about 100% pick-up in the areas desired to be dyed. The resulting padded fabric can be then steamed at a temperature between about 210° F. and about 250° F. for a period of from 20 seconds to about 10 minutes during which time the dye is evacuated from the carrier and deposited in the intersticies of the fabric.

Alternatively, the fabric can be immersed in the dye bath at about 30° C. to about 120° C. for a period of from about 15 minutes to about 1.5 hours. Although the above methods are the most economical for dyeing with the present carrier, it is to be understood that any of the currently employed methods, or modifications thereof, are also applicable and can be employed for dyeing with the carrier composition of the present invention.

Generally, the fabric, after dyeing, is subjected to rinsing and scouring with dilute solutions of a mineral or organic acid such as acetic acid, formic acid, lactic acid, tartaric acid, etc. and/or sulfuric acid, hydrochloric acid, sulfamic acid, etc., in a concentration of between about 0.1 and about 2 wt% and then neutralized. The washing and scouring operation can be repeated as oten as desired and can be augmented with a surfactant to more completely remove any unfixed dye.

By employing the carriers of the present invention, it is found that staining (measured by AATCC Gray Scale) in the undyed portions of a patterned polyester or polyester blend fabric is virtually non-existant and that the color yield achieves a relative rating of 100 in the dyed portions, as compared to a relative rating of 90 for commercial carriers presently being employed.

It is to be understood that other commercial dyeing techniques can be employed in place of the above described steam dyeing operation without any degradation of the carrier composition; the only limitations being on the particular cationic dye or mixture of cationic dyes employed.

The following examples are presented to illustrate the preferred embodiments and advantages and are not to be construed as limiting to the scope of the invention as set forth above in the appended claims. All portions and amounts referred to in the examples are by weight unless otherwise indicated.

EXAMPLE 1

Part I

A thickener solution, i.e., carrier dispersion, was prepared by slowly adding 50 grams of Polygum 272 (obtained from Polymer Industries) to 100 mls. of water at 90° to 100° F. and adjusting the pH of the resulting solution to 6.0 with acetic acid. The carrier composition comprising 80% phenoxyethanol, 8% of a mixture of α-phosphono-w-(phenoxy)-poly(oxy-1,2-ethanediyl) and α,α-phosphine-cobis-w-(phenoxy)-poly(oxy-1,2-ethanediyl), 10% butylbenzoate and 2% triethanol amine (60 grams), was then combined with the thickener solution at pH 6. This composition was labeled Composition A.

A second composition was prepared in a similar manner except that 60 grams of the carrier composition was incorporated in the thickener solution at pH 6 and a mixture of α-phosphono-w-(nonylphenoxy)-poly(oxy-1,2-ethanediyl) and α,α-phosphinecobis-w-(nonylphenoxy)-poly(oxy 1,2-ethanediyl) was substituted for the phosphono ester mixture in the carrier composition of Composition A. This second composition was labeled Composition B.

Still another carrier composition was prepared in a manner similar to Composition B except that the carrier composition employed was a mixture of 90% phenoxyethanol, 5% polyoxyethylated alkyl amine (Katapol PN-430), and 5% GAFAMIDE CDD-518 (a coconut oil/diethanol amine condensate) was substituted for the carrier composition in Composition B. This composition was labeled Composition C.

Another composition was prepared in a manner similar to that employed for composition B except, that in this case the carrier composition was 90% phenoxyethanol, 5% ALIPAL CO436, i.e., the ammonia salt of the sulfated nonylphenoxy poly(ethyleneoxy) ethanol, and 5% GAFAMIDE CDD-518 (the coconut oil/diethanol amine condensate) was substituted for the carrier composition in Composition B. This composition was labeled Composition D.

Still another composition was prepared in the manner similar to that employed for Composition D, except that in this case the carrier composition employed was 80% phenoxyethanol, 10% diphenyl, 2% triethanol amine and 8% of a mixture of α-phosphono-w-(nonylphenoxy)-poly(oxy-1,2-ethanediyl) and α,α-phosphinecobis-w-(nonylphenoxy)-poly(oxy-1,2-ethanediyl) in place of the composition employed in the Composition B. This composition was labeled Composition E.

Five separate and identical dye solutions were each prepared in the following manner. To a mixture of 4 grams of Genacryl Yellow 4G and 3 grams of Genacryl Brilliant Red B, was added 12 grams of glacial acetic acid and the resulting mixture stirred to a paste, after which 150 mls. of water at 90° C. was added and mixed to provide the dye solution.

Each of the above prepared carrier compositions was then mixed with one of the above prepared dye solutions and each of the resulting mixtures was adjust to a pH of 3-3.5 with formic acid, after which it was made up to a total volume of 500 mls. with water.

Five separate samples of a white Dacron fabric composed of a polyester blend, i.e., 50% Dacron 56 and 50% Dacron 92, were padded with the above carrier-dye mixtures at 100° F. to 100% wet pick-up. Each of these fabric samples was then subjected to steaming for 1 minute and 220° F., after which the fabric was rinsed and scoured with 5 grams per liter of Diazopon SS-837 (i.e., an alkyl aryl polyether) and 2 grams per liter acetic acid at 180° F. for 1 minute. After rinsing clear, the fabric samples were treated with about 6 grams per liter potassium permanganate and 10 ml per liter sulfuric acid at room temperature for 1 minute. The liquid was drained and the fabric samples were then treated with 50 grams per liter of sodium bisulfite at 160° F. for 1 minute after which they were rinsed and scoured with 10 grams per liter Igepon T-51 (sodium N-methyl-N-oleoyltaurate) at 200° F. for 1 minute. The samples were then rinsed with water and allowed to dry at room temperature.

The resulting samples were then evaluated for relative staining on the Dacron 56 portion and color yield on the Dacron 92 portion. The results are presented in the following table. The staining rating is based on a range from 1 to 5 where 5 represents severe staining and 1 represents completely unstained, pure white fabric. The fabric samples are indicated by the dye carrier composition employed in dyeing, namely, Compositions A through E.

|  | A | B | C | D | E |
|---|---|---|---|---|---|
| pH | 5.5 | 6.8 | 9.2 | 8.4 | 6.8 |
| Stain* of Disperse Dyeable Polyester Portion | 2 | 2 | 4 | 4 | 3 |
| Relative Color Yield on Cationic Dyeable Portion | 100% | 97% | 92% | 92% | 95% |

*AATCC Gray Scale

Part II

Because of the superiority of carrier Composition A, another Composition (A') was prepared in a manner similar to that used for Composition A except that only 30 grams of the carrier composition (6%) was added to the aqueous thickener solution at pH 6. This carrier composition was then admixed with the same dye solution employed above and used to dye the same Dacron fabric blend in a similar manner. The pH of this dye-carrier composition was 6.8, the stain of disperse dyeable polyester was valued at 2 and the relative color yield on the cationic dyeable portion of the fabric was 85%.

EXAMPLE 2

A commercial dye-carrier composition, namely Intratex TBX, (i.e., 90% phenoxyethanol, 4% neutralized fatty acid, 4% alkandamide and water, suppled by Crompton & Knowles) was combined in a similar manner to that employed in Example 1, Part I above, with the same dye mixture described above and a sample of the same fabric similarly padded, dyed and scoured, with the result that staining on the disperse dyeable portion of the polyester using 12% of the carrier solution (comparable with the solution of Composition A above) was found to have a value of 3. The relative color yield on the cationic dyeable portion of the fabric was 90%.

When 6% of this commercial carrier solution was employed, (comparable to carrier solution Part II), staining remained at a value of 3, but the relative color yield on the cationic dyeable portion of the fabric was reduced to 75%.

These comparative results indicate the superiority of the present composition in the dyeing of blended polyester fabric over the commercial carrier, Intratex TBX which is widely used for this purpose.

It is to be understood that in the above formulations of the carrier composition, any of the other phosphono esters defined by formula I or mixtures of such phosphono esters, can be substituted for carrier compositions A, A$^1$ or B above to provide similar properties of non-staining and high color yield.

What is claimed is:

1. A dye carrier composition for cationic dyestuffs wherein the active carrier is a mixture consisting essentially of from about 50 to about 85 wt% phenoxyethanol; from about 5 to about 45 wt% of the triethanol amine salt of a phenoxy poly (ethyleneoxy) phosphonic ester having the formula:

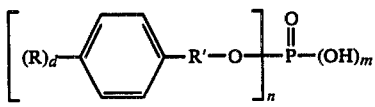

wherein n is a whole integer of 1 or 2; m is 3-n; d is 0 or 1; R' is a mixture of polyoxyethylene units averaging 8, 9, 10, 11 and 12 units and R is alkyl having from 4 to 18 carbon atoms and between about 0 wt% and about 45 wt% butylbenzoate.

2. The composition of claim 1 wherein the composition contains from about 70 to about 82 wt% phenoxyethanol; from about 9 to 15 wt% of said triethanol amine salt of said phenoxy poly(ethleneoxy) phosphonic ester and from about 9 to about 15 wt% butylbenzoate.

3. The composition of claim 1 and between about 0.1 and about 20 wt% of a cationic dye in an inert diluent to provide a dye-carrier composition.

4. The dye-carrier composition of claim 3 where the diluent is water.

5. A cationic dye-carrier composition comprising the carrier composition of claim 1 and between 4 wt% and about 25 wt% of a cationic dye based on the weight of the carrier composition.

* * * * *